United States Patent
Gerber

[15] 3,704,900
[45] Dec. 5, 1972

[54] TOW HITCH
[72] Inventor: Jerome J. Gerber, Murdock, Kans. 67111
[22] Filed: Aug. 24, 1970
[21] Appl. No.: 66,461

[52] U.S. Cl. ..............................................280/491 D
[51] Int. Cl. ................................................B60d 1/00
[58] Field of Search.........280/491 D; 287/99, 92, 98; 292/25, 69, 263

[56] References Cited

UNITED STATES PATENTS 3,572,765  3/1971  Tieben..............................280/491 D
3,419,285  12/1968  Morehouse......................280/491 D Primary Examiner—Leo Friaglia
Assistant Examiner—Robert R. Song
Attorney—John H. Widdowson

[57] ABSTRACT

This invention is a tow hitch structure mountable on the front end portion of a vehicle. More particularly, this invention is a tow hitch structure having a pair of jointed arm members mounted on the front of a vehicle and having a locking means to hold the arms fixed in position, either extended for use or retracted for stowing.

3 Claims, 8 Drawing Figures

INVENTOR
JEROME J. GERBER

BY John H. Widdowson
ATTORNEY

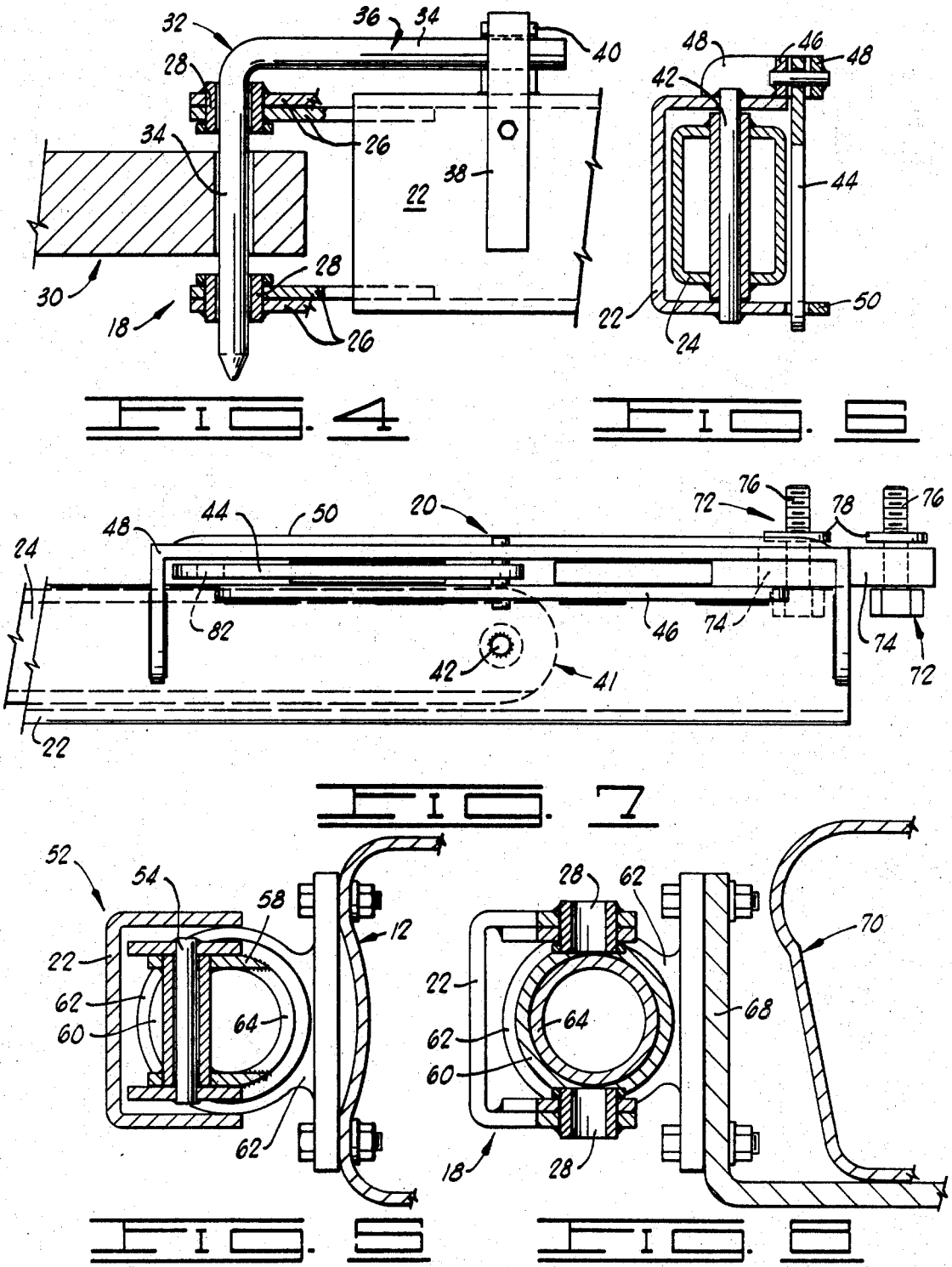

TOW HITCH

Numerous types of vehicle hitches are known in the art which are operable to tow a vehicle. However, these prior art hitches are generally cumbersome to manipulate from the stowed position to the towing position and have a large and unattractive appearance. Some of the prior art devices require extensive modification of the front portion of a vehicle for installation of the tow hitch.

In one preferred specific embodiment the tow hitch of this invention is provided with means to mount it easily in the front bumper area of a vehicle. The tow hitch is not unattractive to the vehicle's appearance and can be easily manipulated from the stowed position to the towing position. The structure includes a pair of jointed extendable arms mounted with the front bumper of the vehicle. The arms meet at a joint forming a pulling coupling and have another joint in the center portion of the individual arms operable to flex and fold the operably extended portion of the arms in line substantially parallel with the bumper. The tow hitch is provided with a lock device at the joints in the center portion of the arms to secure same in the normally extended position or the normally retracted position.

One object of this invention is to provide a tow hitch overcoming the aforementioned disadvantages of prior art devices.

Still, one other object of this invention is to provide a tow hitch structure easily mountable with the front bumper area of a vehicle.

Still another object of this invention is to provide a tow hitch which is easily stowed and locked against the front end of a vehicle when not in use and easily extends therefrom and is locked in the extended position for use.

Still another object of this invention is to provide a tow hitch which does not distract from the appearance of the vehicle and is economical to manufacture and simple to use.

Various other objects, advantages, and features of the invention will become apparent to those skilled in the art from the following discussion, taken in conjunction with the accompanying drawings, in which:

FIG. 4 is a partial cross-sectional view of the pulling coupling portion of the tow hitch shown attached to a pulling hitch;

FIG. 5 is a cross-sectional view of the tow hitch taken on line 5—5 of FIG. 2;

FIG. 6 is a cross-sectional view of the tow hitch taken on line 6—6 of FIG. 2;

FIG. 7 is an enlarged top plan view of the latch portion of one arm of the tow hitch with the tow hitch shown in the retracted position; and FIG. 8 is a cross-sectional view taken through the pulling coupling of the tow hitch with the tow hitch in the retracted position and mounted on an extension member from the front end portion of a vehicle.

Figure 1:
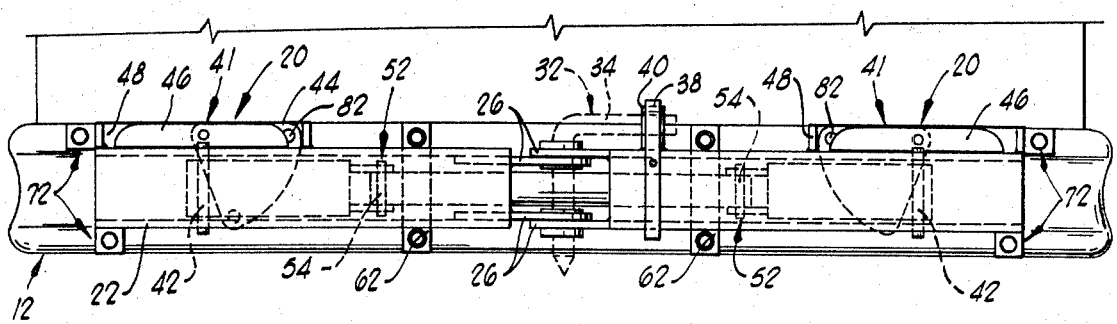
FIG. 1 is a front elevation view of the tow hitch mounted on a vehicle bumper, shown in the retracted and locked position.

The following is a discussion and description of preferred specific embodiments of the new tow hitch of this invention, such being made with reference to the drawings, whereupon the same reference numerals are used to indicate the same or similar parts and/or structure. It is to be understood that such discussion and description is not to unduly limit the scope of the invention.

Figure 2:
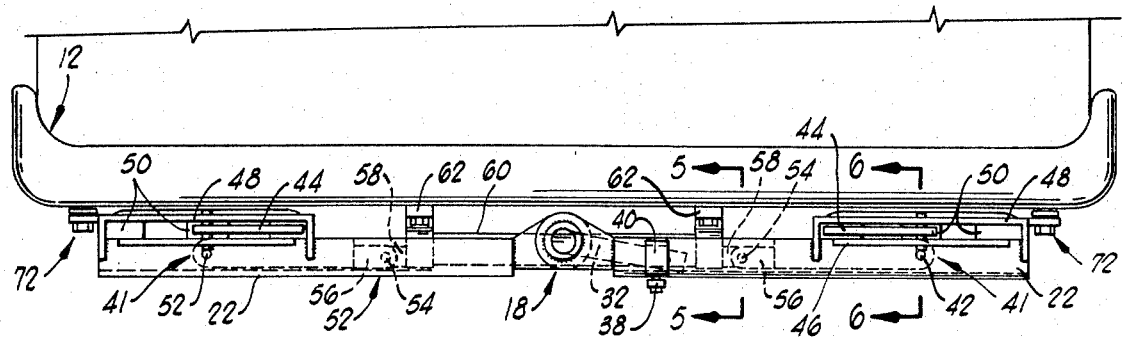
FIG. 2 is a top plan view of the tow hitch shown in FIG. 1.
Figure 3:
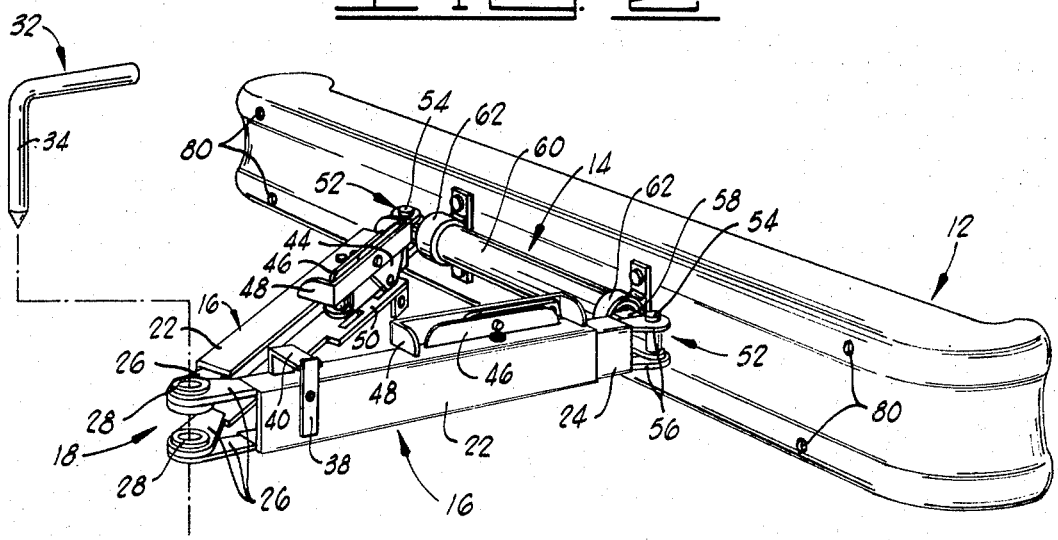
FIG. 3 is a frontal perspective view of the tow hitch mounted on a bumper shown in the normal extended and locked towing position, with the clevis pin removed.

Referring to the drawings in detail and in particular to FIGS. 1, 2 and 3, the tow hitch structure of this invention, generally indicated at 10, is shown mounted with the front end bumper 12 of a vehicle. The tow hitch 10 includes a mount assembly 14 with jointed arms 16 extendable therefrom forming a pulling coupling 18 on the end of the extended arms and a lock assembly 20 on the arms 16 to hold them in either the extended or retracted position.

The jointed arms 16 include an outer arm member 22 and an inner arm member 24. The outer arm member 22 has a joint in the extendable end which in combination with the other outer arm member 22 forms the tow hitch portion of the pulling coupling 18. The outer arm members have a rectangular cross section open on one side and the tow hitch portion of the pulling coupling 18 is formed by arm end members 26 extending from the upper and lower sides of the channel member of the outer arm member 22 and having bearings 28 between the arm end members 26. The pulling coupling 18 is adapted to mount with a hitch 28 by means of a removable clevis pin 32 extending through the bearings 28. The clevis pin 32 is preferably constructed with a curved center portion 34 for a purpose to be explained later, and the upper portion 36 which can be held by a clip lock 38 and clip member 40 above the end portion of the outer arm member 22.

The inner arm 24 and the outer arm 22 are connected at a joint 41 with one end of the inner arm member 24 enclosed in the end portion of the outer arm member 22 and connected by a pin member 42. The joint 41 allows the arms 16 to move easily from the extended position as shown in FIG. 3 to the retracted position as shown in FIGS. 1 and 2. The lock assembly 20 is positioned at the joint between the inner arm member 24 and the outer arm member 22 operable to hold the inner arm member 24 within the outer arm member 22 in both the extended position or the retracted position. The lock assembly 20 has a lever member 44 suspended from the upper support members 46 and 48 mounted with the upper portion of the outer arm member 22. The lever support member 48 forms a slotted passageway with the other member 46 that allows the lever member 44 to move from one position to another as will be explained. The end portions of the lever member 44 fit into a slotted member 50 on the lower portion of the outer arm member 22. The inner arm member 24 is a rectangular shaped member sized relative the interior of the outer arm member 22 such that when the inner arm member 22 is in either the extended or retracted position the lever member 44 will easily pass beside the inner arm member and contact with the slotted member 50. The inner arm member 24 is attached with the mount assembly 14 by means of a clevis, indicated at 52, held by a pin member 54. The end portion of the inner arm member 24 at the joint 52 has a pair of end members 56 forming the yoke of the clevis and holding the pin 54 with the center end portion 58 of the mount assembly 14.

The mount assembly 14 includes an outer cylinder member 60 mountable by pillow blocks 62 on the ends thereof and an inner cylinder member 64 with ends 58 to mount with the inner arm end members 56. The inner cylinder member 64 is connected with the jointed arms 16 by the clevis 52 of the inner arm member 24 and it is free to rotate within the outer cylinder member 60; this rotation is necessary to allow flexure between the tow vehicle and the towed vehicle. The ends of the outer cylinder member 60 are contained by the ring portion of the pillow blocks 62. The ends 58 of the inner cylinder member 64 are shaped to mount with the end of the inner arm member 24 and are sized to prevent transverse movement of the inner cylinder member 64 within the outer cylinder member 60.

The mount assembly 14 is preferably adapted to mount with the bumper 12 of a vehicle as shown in FIG. 3 by bolting the pillow blocks 62 directly to the bumper 12. If the bumper of the vehicle is not sufficiently straight in shape or styled to prevent easy mounting of the tow hitch 10, the mount 14 can be easily mounted with the structure of that vehicle. The mount assembly 14 can be easily mounted with a support member 68 as illustrated in FIG. 8. In this mounting arrangement the pillow blocks 62 are preferably bolted with the support member 68 which is rigidly mounted with the frame structure of the vehicle and positioned in front of the styled bumper 70 as shown in FIG. 8. In addition to being supported by the mount assembly 14, the tow hitch 10 has temporary attachments 72 on the ends of the outer arm member 22 to secure it with the bumper 12 or support member 68 when in the retracted position. The temporary attachments 72 include ears 74 extending from the ends of the outer arm member 22 with a bolt 76 extending therethrough with a washer 78 fixed thereto and a threaded portion, indicated at 80, to receive the bolt. When the tow hitch 10 is in the retracted position the outer arm member 22 is locked in position near the bumper 12 or support member 68. The bolt 76 can be threadedly tightened with the threaded portion 80 of the bumper 12 or structure 68 thereby preventing the tow hitch from rattling and as a safety device preventing inadvertent extensions of the arms 16 should the lock 20 fail or be released. Additionally the removable clevis pin 32 can be inserted in the pulling coupling 18 and locked by the clip lock 38 and clip 40 when the tow hitch is in the retracted position or the extended position thereby preventing its loss and to prevent rattling. The clevis pin 32 is bent in the center portion 34 of both end portions in a slight spiral curvature such that it can be easily inserted in the coupling 18 yet when in place and the tow hitch 10 is moved to the retracted position it is put in a restrained condition thus lessening the free and easy movement of the tow hitch 10. The clip lock 38 rotates about the attaching bolt to expose the inner portion of the clip 40 so the upper portion 36 of the clevis pin 32 can be easily placed therein and retained. Normally the longer lower portion of the clip lock 38 holds it in an upright position, as shown, to retain the clevis pin 32 in the clip 40.

The lock apparatus 20 functions to hold the arms 16 in the extended or retracted position. When the arms 16 are in the normal extended position the lever member 44 is in position as can be seen in FIG. 3. The lever member 44 has one end in the slotted member 50 thereby preventing movement of the inner arm member 24. The lever member 44 is easily lifted by the finger hole 82 in the corner thereof to a position outside the open portion of the outer arm member 22; this allows the inner arm 24 to freely rotate. With both arms 16 unlocked, the tow hitch 10 can be easily folded to the retracted position, as shown in FIGS. 1 and 2, and then locked by placing the lever member 44 in the position shown in FIGS. 1 and 2. When the tow hitch 10 is in the retracted position after being locked, the temporary attachments 72 can be tightened and the clevis pin 32 inserted thereby further securing the tow hitch. When the tow hitch is secured in the retracted position as described, it will not be normally damaged if pushed on, provided any pushing done by or on the vehicle is not extreme.

In the manufacture of the tow hitch 10 of this invention, it is obvious the arms 16 and mount 14 are constructed of sufficient strength to safely tow a vehicle, of course sized proportional to the size of the vehicle.

In the use and operation of the tow hitch 10 of this invention, it is seen that same provides a functional and not unsightly tow hitch due to the jointed arms 16 and mount assembly 14 which is easily adaptable with the front end of a vehicle. For safety and functional reasons it is seen the locking apparatus 20 holds the arms 16 fixed in either the extended or retraced positions.

As will be apparent from the foregoing description of the applicant's tow hitch, relatively simple and safe means have been provided to tow a vehicle by a hitch mounted on the front end thereof. The two hitch is easily mounted on existing vehicles, simple to use and does not detract greatly from the appearance of the vehicle when stowed and not in use.

While the invention has been described in conjunction with preferred specific embodiments thereof, it will be understood that this description is intended to illustrate and not limit the scope of the invention, which is defined by the following claims.

I claim:

1. A tow hitch structure, including:
    a. a mount means mountable on the front end portion of a vehicle,
    b. a pair of jointed arm members mounted with said mount means,
    c. a lock means mounted with each of said jointed arm members adapted to hold same fixed in an extended or retracted position,
    d. said arm members being substantially similar and each having an inner arm member and an outer arm member with a pivotal joint therebetween, sad inner member being pivotally joined on one end portion thereof with said mount means and on the other end portion with said outer arm member, said outer arm members being pivotally joined with one another on one end portion, forming a pulling coupling,
    e. said lock means having a lever member mounted with said outer arm member at said pivotal joint operable to prevent rotation of said arm members when said lever member is in a locked position, and f. said lever member being rotatable about an axis from the locked extended to the locked retracted position for anchoring purposes.

2. A tow hitch structure as described in claim 1, wherein:
   a. said mount means has a pillow member attached with the outer member thereof to mount same with said front end portion of said vehicle,
   b. said outer arm member is an open channel member of rectangular cross-section, said inner arm member has a rectangular cross-sectional shape sized to be enclosable within said outer arm member,
   c. said outer arm members at said pulling coupling have a bearing member therein and therebetween,
   d. said lever member has a shape substantially that of a sector of a circle rotatably supported from the upper portion of said outer arm member on the open side thereof at the apex portion thereof and having the other corner portions thereof insertable in apertures in a slotted member supported from the lower portion of said outer arm member,
   e. said mount means has an inner member with the ends thereof joining said inner arm members operable to vertically rotate said jointed arm members, and
   f. said lever member is operable to lock said inner arm member within said outer arm member.

3. A tow hitch structure as described in claim 2, wherein:
   a. said tow hitch is mounted with the front portion of a vehicle
   b. said tow hitch in sad retracted position has said outer arm members substantially in line, said inner arm members are substantially in line with said mount means enclosed within sad outer arm members and locked in place by said lever means, and
   c. said tow hitch in said extended position has said outer arm members substantially in line with said inner arm members with said pulling coupling extended from said front portion of said vehicle, said inner arm members are locked within said outer arm members by said lever member and said tow hitch can freely rotate vertically about said mount means.

* * * * *